Figure 1:
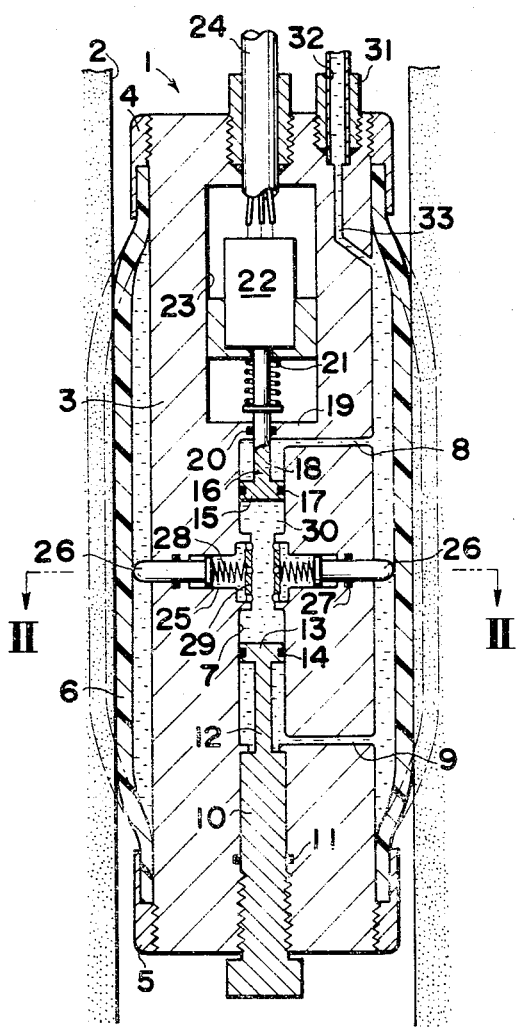

United States Patent
Ogura

[11] 3,896,663
[45] July 29, 1975

[54] DILATOMETER
[75] Inventor: Kimio Ogura, Urawa, Japan
[73] Assignee: Oyo Corporation, Tokyo, Japan
[22] Filed: June 24, 1974
[21] Appl. No.: 482,796

[52] U.S. Cl. .............................................. 73/88 E
[51] Int. Cl. .......................................... G01n 33/24
[58] Field of Search ...................... 73/88 E, 84, 151

[56] References Cited
UNITED STATES PATENTS
3,364,737   1/1968   Comes.................................. 73/88 E
3,572,114   3/1971   Ruppencit et al. ........... 73/88 E UX

*Primary Examiner*—Jerry W. Myracle
*Attorney, Agent, or Firm*—Wenderoth, Lind & Ponack

[57] ABSTRACT

A flexible tube is expansibly mounted to a sounder body, through which a plurality of detector elements are provided to be extensible in the radial directions and abut at their respective outer ends against the inside of the flexible tube. A sealed space is provided in the sounder body and filled with a liquid therein to be radially expansible with extension of the detector elements. Toward the liquid in the sealed space, a follower member is urged to be displaced by the radial expansion of the sealed space, whereby when the flexible tube is expanded by a fluid material fed therein, the displacement of the follower member is measured to know the elasticity and creep in the ground.

8 Claims, 4 Drawing Figures

PATENTED JUL 29 1975

3,896,663

SHEET 1

DILATOMETER

This invention relates to a dilatometer for measuring elasticity and creep in the ground used, for example, before constructing footings such as for buildings.

In a known dilatometer, an expansible rubber tube closed at its lower end is inserted into a bore hole formed deeply in the ground, and a fluid material is fed in the rubber tube under pressure from above the ground to expand the cylindrical side wall of the tube against the bore wall. Checking the amount of the fluid material fed into the tube, the deformability in the ground is measured.

Such a dilatometer has advantages over another known apparatus in which the deformability in the ground is measured by checking the degree of displacement of plural pairs of metal plates pressed against a bore wall in the ground by jacks or the like. That is, firstly, the former dilatometer can be smaller than the latter apparatus as it needs no special means such as jacks for receiving the reaction force from the bore wall; secondly, the former dilatometer can have wider pressure area against the bore wall and thereby have reliable measurement; and thirdly, the former dilatometer can press the bore wall with substantially equal pressure by the rubber tube without substantial effect being incured by the uneven surface of the bore wall.

However, in the known dilatometer, in case a fluid material is fed in the tube under high pressure for measurement of the ground, there causes an axial expansion of the tube and makes it difficult to obtain accurate measurement from the amount of the fluid material fed in the tube. Furthermore, as the tube deeply placed in the ground is communicated with a fluid material feeding means placed on the ground through a flexible supply pipe, the supply pipe tends to expand radially by the fluid material under high pressure, thereby causing an error in measuring values from the amount of the fluid material fed.

Especially, in the measurement of the elasticity and creep in the firm ground such as rocky stratum or rock bed, although the fluid material such as water is fed under very high pressure into the rubber tube in the bore hole, the rubber tube can radially expand only a slight amount against the bore wall. In the known dilatometer, the amount of the fluid material fed in the rubber tube is a factor to determine the deformation in the bore, so that even a small amount of reduction of volume of the fluid material itself due to the compression thereof exerts a fatal influence upon the accuracy of the measurement.

Accordingly, a main object of the present invention is to provide an improved dilatometer which can accurately measure the elasticity and creep in the ground without depending upon the amount of fluid material fed therein.

Another object of the present invention is to provide a dilatometer suited for measuring the elasticity and creep in a firm ground.

According to the present invention, a flexible tube is expansibly mounted to a sounder body, which is to be inserted into ground for measurement of the deformability thereof. Through the sounder body, a plurality of detector elements are provided to be extensible in the radial directions and abut at their respective outer ends against the inside of the flexible tube. In the sounder body, a sealed space is provided and filled with a liquid therein. The space is radially expansible with extension of the detector elements. Toward the liquid in the sealed space, a follower member is urged to be displaced by the radial expansion of the sealed space. A fluid material is fed inside of the flexible tube and is led to the follower member outside of the sealed space. The displacement of the follower member by the expansion of the flexible tube is measured by measuring means.

Thus, in the present dilatometer, though the radial deformation or expansion of the bore hole in the ground is effected by the fluid material fed in the flexible tube under high pressure, the amount of deformation of the bore hole at a selected place is detected by the radial extension of the detecting elements, and the amount of extension of the detecting elements is transmitted to the liquid in the sealed space as the displacement of the follower member. Accordingly, the amount of deformation of the bore hole is measured by converting the amount of displacement of the follower member into an electric signal. This electric signal and the pressure applied to the fluid material are made factors to determine the elasticity and creep in the ground. Consequently, independent of the amount of the fluid material fed in the dilatometer, accurate elasticity and creep in the ground can be measured easily.

Further, since the radial extensions of all of the detecting elements are transmitted to the liquid in the sealed space, averaged deformation at the selected position in the ground can be detected from the amount of displacement of the follower member, which makes the measurement of the deformability easy.

Figure 2:
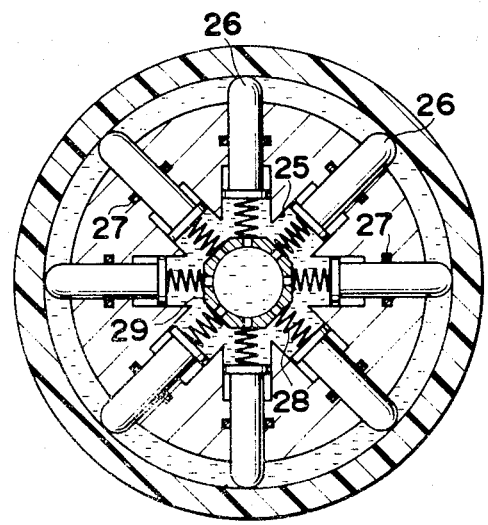
Figure 3:
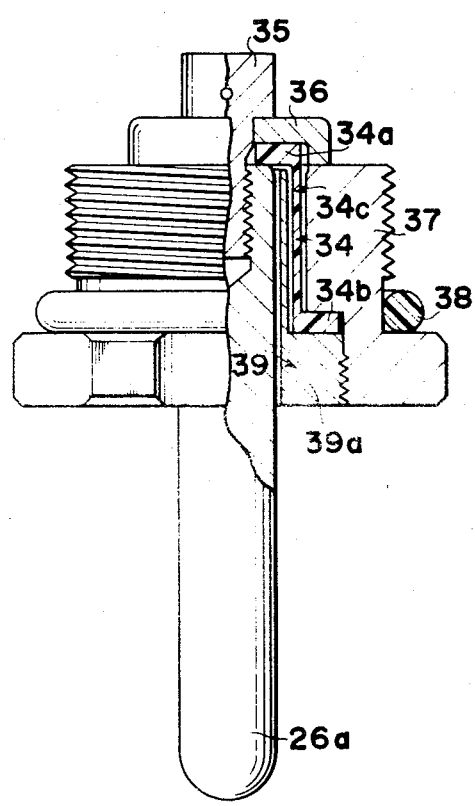
Figure 4:
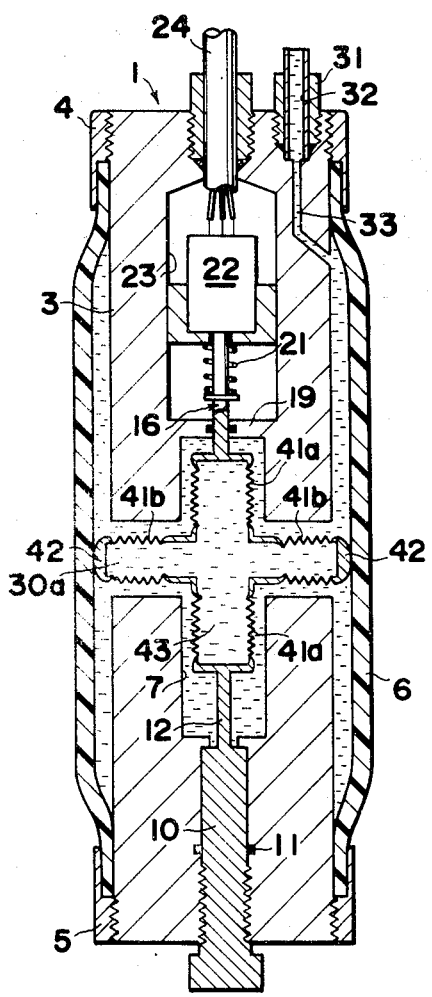

The aforementioned and other objects and features of the present invention will be apparent from the following detailed description of specific embodiments thereof, when read in conjunction with the accompanying drawings, in which:

FIG. 1 is a vertically sectioned view showing a dilatometer according to an embodiment of the present invention, FIG. 2 is a cross-section showing an arrangement of detecting pistons in the dilatometer in FIG. 1, FIG. 3 is a partially sectioned view showing another embodiment of the detecting piston, FIG. 4 is a vertically sectioned view showing dilatometer according to another embodiment of the present invention.

Referring to FIGS. 1 and 2, a dilatometer 1 according to a first embodiment of the present invention is shown as suspended in a bore hole 2 formed in the ground. The dilatometer 1 comprises a cylindrical sounder body 3 to the upper and lower ends of which cramp screws 4, 5 are engaged to firmly hold the upper and lower end portions of a rubber tube 6 against the sounder body 3.

From the bottom of the sounder body 3 an axial bore 7 extends to a level higher than the middle portion of the sounder body 3. The axial bore 7 communicates with the outside of the cylindrical side wall of the sounder body 3 through upper and lower radial passages 8 and 9. Inserted into the lower portion of the axial bore 7 is a threaded rod 10 engaged to the sounder body 3 with a sealing ring 11. The threaded rod 10 has a neck portion 12 of a narrower diameter than the axial bore 7 and extending upwards beyond the lower passage 9, and a head 13 liquid-tightly abutting against the inner wall of the axial bore 7 with a sealing O-ring 14.

Through the upper portion of the axial bore 7 slidably provided is a piston head 15 of a follower piston 16, the piston head 15 extending downwardly beyond the upper passage 8 and being liquid-tightly abutted against the inner wall of the axial bore 7 with a sealing O-ring 17. A piston rod 18 of the piston 16 is narrower than the piston head 15 and extends through the wall portion 19 defining the upper end of the axial bore 7 with a liquid-tight sealing O-ring 20. The piston rod 18 is provided with a spring 21 for urging the piston head 15 downwards and is connected at its upper end with a measuring device 22 provided in a liquid-tight closed space 23 in the sounder body 3, which device converts the displacement of the piston head 15 into an electrical signal, such as a differential transformer or a potentiometer. The electric signal from the device 22 is transmitted above the ground by conductive wires in a pipe 24 which is inserted into the closed space 23 through the upper end portion of the sounder body 3.

At the intermediate portion between the upper and lower passages 8, 9 in the sounder body 3, eight radial passages 25 are formed through the sounder body 3 from the axial bore 7 to the cylindrical outer side of the sounder body 3. Each adjacent two radial passages 25 form equal angles with each other. A detecting piston 26 is snugly and slidably disposed within each radial passage 25 with a liquid-tight sealing O-ring 27. Each detecting piston 26 is urged radially outwardly by a compression spring 28 provided between the inner end of the detecting piston and a perforated ring-like member 29 in the axial bore 7. Thus, a sealed or closed space 30 filled with an incompressible liquid is formed within the sounder body between the upper and lower heads 15, 13 and the inner ends of the detecting pistons 26.

Provided through the upper end portion of the sounder body 3 is a coupling 31 in which a pipe 32 for feeding liquid is fixed. The feed pipe 32 communicates with a liquid feed passage 33 leading to the outer cylindrical side wall of the sounder body 3 inside of the rubber tube 6.

In operation, the dilatometer 1 thus constructed is first inserted into the bore hole 2 in the ground to the depth to be measured. A fluid material such as water is fed under high pressure into the space between the cylindrical outer side wall of the sounder body 3 and the rubber tube 6 from above the ground through the feed pipe 32 and the feed passage 33. The water then comes in the upper and lower passages 8, 9 leading to the upper and lower sides of the upper and lower heads 15, 13, respectively, in the sounder body 3 and is filled in the space between the rubber tube 6 and the sounder body 3. With such an arrangement, the pressure balance can be obtained between the liquid in the closed space 30 and the liquid about the sounder body 3. When the ground to be measured is relatively soft, the rubber tube 6 expands against the bore wall as the liquid pressure increases as shown by chain lines in FIG. 1, whereby the detecting pistons 26 urged against the rubber tube 6 by the springs 28 further extend radially outwardly, following to the expansion of the rubber tube 6. At this time, the space 30 filled with the liquid and sealed against the water fed in the passages 8, 9 comes to have a reduced pressure in it, so that the upper follower piston goes down. The displacement of the upper piston 15 is detected by the measuring device 22 connected to the piston rod 18 and is converted into an electric signal, which is electrically transmitted above the ground. Thus, comparing the liquid pressure fed to expand the rubber tube 6 with the amount of displacement of the upper piston 15, the lateral pressure in the ground is measured accurately.

In the embodiment shown in FIGS. 1 and 2, it is possible to omitt the springs 28 for urging the detecting pistons radially outwardly by increasing the compression force of the spring 21, which urges the upper piston 16 downwards.

When the rubber tube 6 is to be replaced with another one due to breakage threrof for example, the threaded rod 10 provided through the lower portion of the sounder body 3 is screwed down, whereby the pressure in the sealed space is reduced enough to retreat the detection pistons 26 inside of the sounder body 3. Accordingly, the broken rubber tube can easily be removed along smooth cylindrical side wall of the sounder body 3.

In FIG. 3, another structure for radially extending the detecting pistons is shown, in which a flanged annular cylindrical rubber sleeve 34 is employed for each detecting piston 26a in place of the spring 28 in FIGS. 1 and 2. The rubber sleeve 34 has an inner flange 34a and an outer flange 34b. The inner flange 34a is clamped between the inner end of the detecting piston 26a and an annular cap metal 36, both being threaded to a bolt 35. The outer flange 34b is clamped between a hollow bolt 37 threaded to the radial passage 25 in the sounder body 3 with a liquid-tight O-ring 38 and a flange portion 39a of a hollow cylindrical member 39 threaded to the hollow bolt 37. The hollow cylindrical member 39 loosely extends in the axial direction of the detecting piston 26a thereabout. The rubber sleeve 34 has, as shown in FIG. 3, a cylindrical portion 34c in the axial direction of the detecting piston 26a, which portion is loosely sandwiched between the cylindrical portions of the hollow bolt 37 and the hollow cylindrical member 39.

With the use of such rubber sleeve 34 it becomes possible to eliminate frictions caused by reciprocal movement of the detection pistons, so that the reliable movements thereof are insured, while maintaining liquid tight sealings.

In a third embodiment shown in FIG. 4, a liquid-tight closed space 30a is formed axially and radially in the sounder body 3 by axial bellows 41a and radial bellows 41b. The diameter of each bellows 41a, 41b is smaller than those of an axial bore 7a and radial passages 25a to allow the liquid fed to the outside of the sounder body 3 to freely pass about the bellows 41a, 41b. The radial bellows 41b each has a solid cap 42 which contacts to the inside of the rubber tube 6. The axial upper and lower bellows 41a are attached at the upper and lower ends thereof to the upper and lower heads 15, 13 of the piston 16 and the threaded rod 10, respectively. The axial and radial bellows 41a, 41b define the sealed or closed space 30a in which incompressible liquid 43 is tightly filled, so that, by the action of the compression spring 21, the solid caps 42 of the radial bellows 41b press the rubber tube 6 radially and outwardly by means of the liquid in the closed space 30a.

In the same manner as disclosed in the first embodiment, when the rubber tube 6 expands against the bore wall in the ground by the compressed liquid fed around the sounder body 3, the solid caps 42 extend radially and the upper follower piston 16a goes down. The displacement of the upper piston 16a is converted into electrical signal by a measuring device 22a of the type mentioned in the first embodiment, so that the deformation in the ground can be accurately measured.

Although the present invention has been described with reference to preferred embodiment thereof, many modifications and alterations may be made within the spirit of the present invention.

What is claimed is:

1. A dilatometer comprising a sounder body, a flexible tube expansibly mounted to said sounder body, a plurality of detector elements radially extensible through said sounder body and abutting at their respective outer ends against the inside of said flexible tube, a sealed space provided in said sounder body and filled with a liquid therein, said sealed space being radially expansible with extension of said detector elements, a follower member urged toward the liquid filled in said sealed space and displaced by the radial expansion of said sealed space, means for feeding a fluid material inside of said flexible tube, said fluid material being led to said follower member outside of said sealed space, and means for measuring amount of displacement of said follower member.

2. A dilatometer as claimed in claim 1, wherein said follower member has a lower head portion which defines an upper end of said sealed space, and an upwardly extending portion to which said measuring means are connected to convert the amount of displacement of said lower head portion into an electrical signal.

3. A dilatometer as claimed in claim 1, wherein said detector elements are radially disposed with equal angular intervals and define radial ends of said sealed space by their inner ends.

4. A dilatometer as claimed in claim 1, wherein said sealed space is defined at its lower end by a head portion of a rod threaded through the lower portion of said sounder body, and said fluid material supplied inside of said flexible tube is led to outside of said head of said threaded rod.

5. A dilatometer as claimed in claim 1, wherein said sealed space is defined by expansible bellows, and said detector elements are attached to the radial outer ends of said bellows.

6. A dilatometer as claimed in claim 1, wherein each detector element has a radially extensible flanged rubber sleeve the inner flange portion of which is liquidtightly fixed to the inner portion of said detector element and the outer flange portion of which is liquidtightly fixed to said sounder body.

7. A dilatometer as claimed in claim 2, wherein said measuring means is a differential transformer.

8. A dilatometer as claimed in claim 2, wherein said measuring means is a potentiometer.

* * * * *